United States Patent
Reul et al.

(10) Patent No.: US 6,526,340 B1
(45) Date of Patent: Feb. 25, 2003

(54) MULTI-VEHICLE COMMUNICATION INTERFACE

(75) Inventors: David A. Reul, Owatonna, MN (US); Kurt R. Raichle, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 09/468,697

(22) Filed: Dec. 21, 1999

(51) Int. Cl.[7] .................... G06F 13/00; G01M 15/00; G01M 17/00
(52) U.S. Cl. .................... 701/29; 701/33; 340/439; 73/116
(58) Field of Search ................. 701/29, 33, 35, 701/32; 340/439; 73/116, 118.1, 117.2

(56) References Cited

U.S. PATENT DOCUMENTS

| | | | |
|---|---|---|---|
| 4,739,323 A | 4/1988 | Miesterfeld et al. | 340/825.5 |
| 4,853,850 A * | 8/1989 | Krass, Jr. et al. | 364/200 |
| 4,887,064 A * | 12/1989 | Drori et al. | 340/426 |
| 4,962,456 A | 10/1990 | Abe et al. | 364/431.01 |
| 4,975,846 A | 12/1990 | Abe et al. | 364/424.03 |
| 4,975,847 A | 12/1990 | Abe et al. | 701/32 |
| 5,003,477 A | 3/1991 | Abe et al. | 701/33 |
| 5,056,023 A | 10/1991 | Abe | 701/32 |
| 5,132,905 A | 7/1992 | Takai et al. | 364/424.03 |
| 5,150,048 A | 9/1992 | McAuliffe et al. | 714/724 |
| 5,319,962 A | 6/1994 | Kaminski et al. | 73/116 |
| 5,416,917 A | 5/1995 | Adair et al. | 707/203 |
| 5,459,660 A | 10/1995 | Berra | 701/33 |
| 5,555,498 A | 9/1996 | Berra et al. | 364/424.03 |
| 5,737,711 A | 4/1998 | Abe | 701/29 |
| 5,794,164 A * | 8/1998 | Beckert et al. | 701/1 |
| 5,916,287 A * | 6/1999 | Arjomand et al. | 701/29 |
| 6,073,063 A * | 6/2000 | Leong Ong et al. | 701/35 |
| 6,167,255 A * | 12/2000 | Kennedy, III et al. | 455/414 |
| 6,181,992 B1 * | 1/2001 | Grune et al. | 701/29 |
| 6,202,008 B1 * | 3/2001 | Beckert et al. | 701/33 |

FOREIGN PATENT DOCUMENTS

| | | |
|---|---|---|
| JP | 1210844 | 8/1989 |
| JP | 3111733 | 5/1991 |
| JP | 8136411 | 5/1996 |

* cited by examiner

Primary Examiner—Tan Q. Nguyen
Assistant Examiner—Dalena Tran
(74) Attorney, Agent, or Firm—Baker & Hostetler LLP (57) ABSTRACT

A diagnostic tool communicates with a plurality of motor vehicle control units and implements at least two different communication protocols within a single motor vehicle. The diagnostic tool includes a processor and a field programmable gate array. The processor executes diagnostic routines and thereby provides messages to one of the plurality of motor vehicle control units. The field programmable gate array provides a selectable multiple protocol interface that is coupled between the plurality of motor vehicle control units and the processor. The selectable multiple protocol interface converts processor messages into a format that is readable by the selected motor vehicle control unit and converts received control unit information into a format that is readable by the processor.

21 Claims, 5 Drawing Sheets

MULTI-VEHICLE COMMUNICATION INTERFACE

BACKGROUND OF THE INVENTION

The present invention is directed to a diagnostic tool and more specifically to a diagnostic tool for communicating with a motor vehicle that includes multiple control units that implement at least two different communication protocols.

Today, motor vehicles include various electronic control units mounted in the motor vehicle. The control units may control various systems and/or subsystems within the motor vehicle. For example, a control unit may control an engine, a transmission, a brake or a steering mechanism. These control units are typically coupled to a variety of sensors and/or actuators. Depending on the vehicle, the control units within a motor vehicle may implement various different communication protocols. In addition, many of these control units may operate at different voltage levels and may transmit in differential or single-ended modes.

In a typical motor vehicle, an engine control unit receives a plurality of input signals. These input signals may include, for example, a coolant temperature sensor, an oxygen sensor, an intake manifold pressure sensor, an air-conditioner switch, a vehicle speed sensor, an accelerator switch, a throttle position sensor, a neutral switch and an engine speed sensor. The engine control unit receives and processes the input signals received from the various sensors and switches. In response to these input signals, the engine control unit may output various control signals. These control signals may control, for example, a canister purge solenoid, an exhaust gas recirculation (EGR) system actuator, an idling control actuator, an ignition coil and/or a plurality of fuel injectors.

A typical transmission control unit also receives a plurality of input signals from various sensors. In response to these input signals, the transmission control unit outputs various control signals. These control signals may control various automatic transmission actuators and thereby control an automatic transmission. In a typical motor vehicle, a brake control unit receives a plurality of input signals from a brake switch and/or a plurality of wheel speed sensors. In response to these input signals, the brake control unit may produce various control signals that control brake actuators of an anti-lock braking system.

A typical speed control unit receives input signals from a speed set switch and a vehicle speed sensor. In response to these input signals, the speed control unit adjusts a throttle actuator to run the motor vehicle at an approximately constant speed. The speed control unit may also receive input signals from a brake switch, an accelerator switch, a neutral switch, a deceleration switch and/or a resume switch. In response, the speed control unit may discontinue constant speed control or reset a constant speed after changing the speed of the motor vehicle. Thus, as described above, a typical motor vehicle utilizes multiple control units for controlling the operation of the motor vehicle.

One of the more important functions performed by a motor vehicle control unit involves the monitoring of motor vehicle emissions. The Federal Clean Air Act of 1990 required that all cars and light trucks sold in the United States after Jan. 1, 1996, adhere to the California Air Resources Board (CARB) requirements. A primary objective of the CARB requirements was the implementation of a system, within a motor vehicle, to monitor the electronic engine management and emission control systems of the motor vehicle. This system was to alert a driver, in the early stages, of an emission control component or system failure and provide diagnostic information about the failure. In response to the CARB requirements, on-board diagnostics (OBD) II was implemented. The Society of Automotive Engineers (SAE) has set forth numerous standards that are applicable to OBD II equipped motor vehicles. For example, SAE J2012 sets forth the common diagnostic trouble codes (DTCs) and SAE J2190 defines the common diagnostic test modes (DTMs).

An OBD II compliant vehicle can include one or more of three communication protocols; SAE J1850 variable pulse width modulation (VPWM), SAE J1850 pulse width modulation (PWM) and ISO 9141. Most current General Motors (GM) cars and light trucks implement the J1850 VPWM communication protocol. A majority of current Chrysler, European and Asian Import vehicles implement the ISO 9141 communication protocol. Most current Ford vehicles implement the J1850 PWM communication protocol. However, motor vehicles that are not OBD II compliant have implemented various other communication protocols. In addition, OBD II compliant motor vehicles may include motor vehicle control units that implement other non-OBD II compliant communication protocols.

In a typical motor vehicle when a fault occurs, that is monitored by a control unit, that fault is logged within memory. In a typical situation, a malfunction indicator light (MIL) is also lit to inform a driver of the motor vehicle that a problem exists. In attempting to trouble-shoot an indicated fault, a service technician typically connects a diagnostic tool to a diagnostic connector provided on the motor vehicle. A typical diagnostic tool includes a microcontroller and interface circuitry to convert the electronic signals supplied by a control unit in the motor vehicle to a signal that is readily useable by the microcontroller of the diagnostic tool.

Certain diagnostic tools have included multiple hardwired communication circuits that allowed the diagnostic tool to interpret multiple protocols from different control units. Other diagnostic tools have included a field programmable gate array (FPGA). The FPGA allowed a diagnostic technician to download different images into the FPGA, such that the FPGA could accommodate different communication protocols. In this case, the FPGA served as a communication interface between one of the motor vehicle control units and the microcontroller located in the diagnostic tool. However, diagnostic tools including FPGAs of this nature have only provided one communication protocol interface at a time. That is, these FPGAs have required reprogramming (i.e., a new image was loaded into the FPGA) in order to communicate with a control unit that used a different communication protocol. However, many motor vehicles include multiple control units that implement different communication protocols within the same motor vehicle.

SUMMARY OF THE INVENTION

An embodiment of the present invention is directed to a diagnostic tool for communicating with a plurality of motor vehicle control units that implement at least two different communication protocols. The diagnostic tool includes a processor and a field programmable gate array. The processor executes diagnostic routines and thereby provides messages to one of the plurality of motor vehicle control units. The field programmable gate array provides a selectable multiple protocol interface that is coupled between the plurality of motor vehicle control units and the processor.

The selectable multiple protocol interface converts processor messages into motor vehicle control unit readable formats and converts received control unit information into a processor readable format.

These and other features, advantages and objects of the present invention will be further understood and appreciated by those skilled in the art by reference to the following specification, claims and appended drawings.

DETAILED DESCRIPTION OF THE INVENTION

Figure 2A:
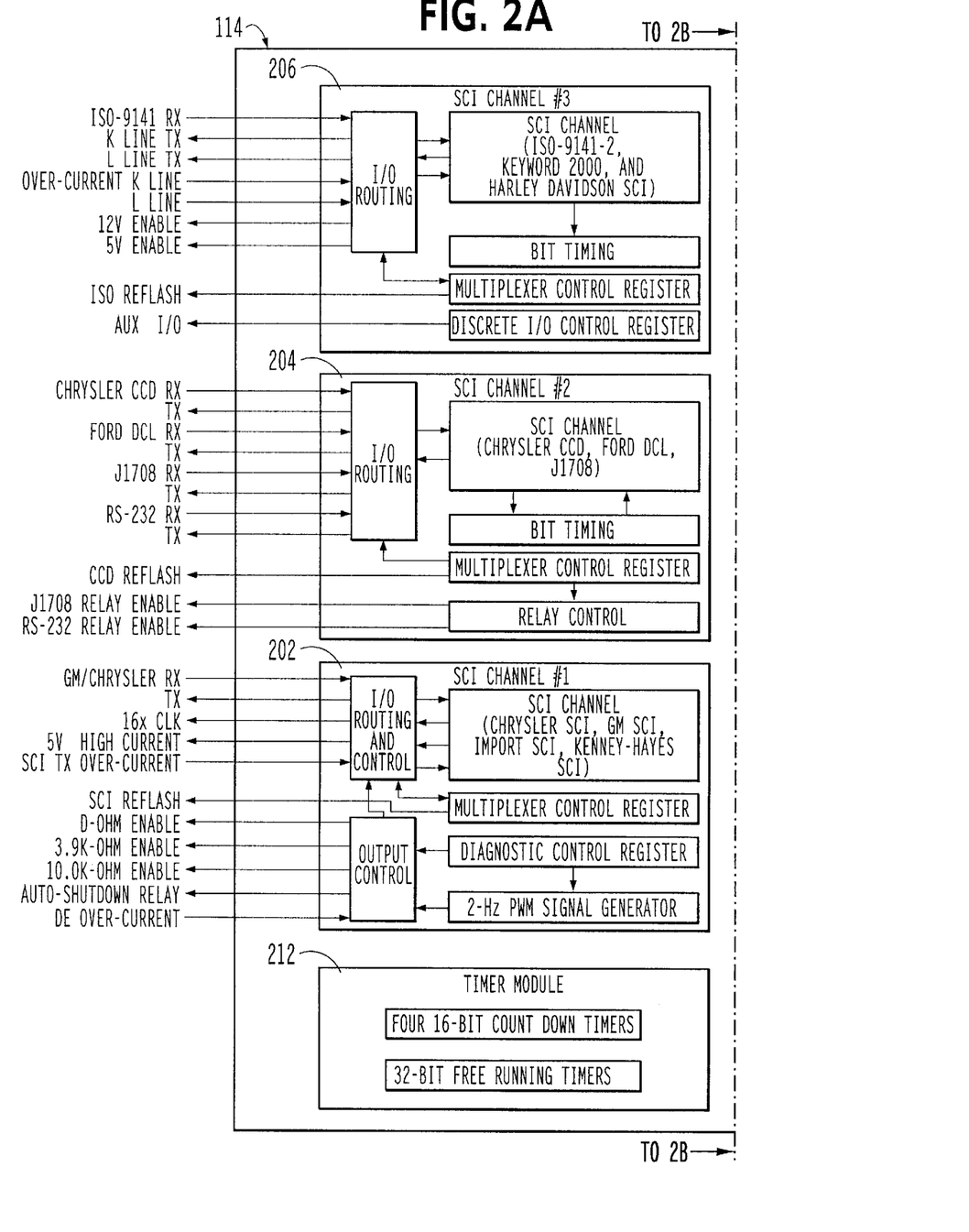
FIG. 2 is a block diagram of a logic device implementing various communication protocol modules, according to an embodiment of the present invention.
Figure 2B:
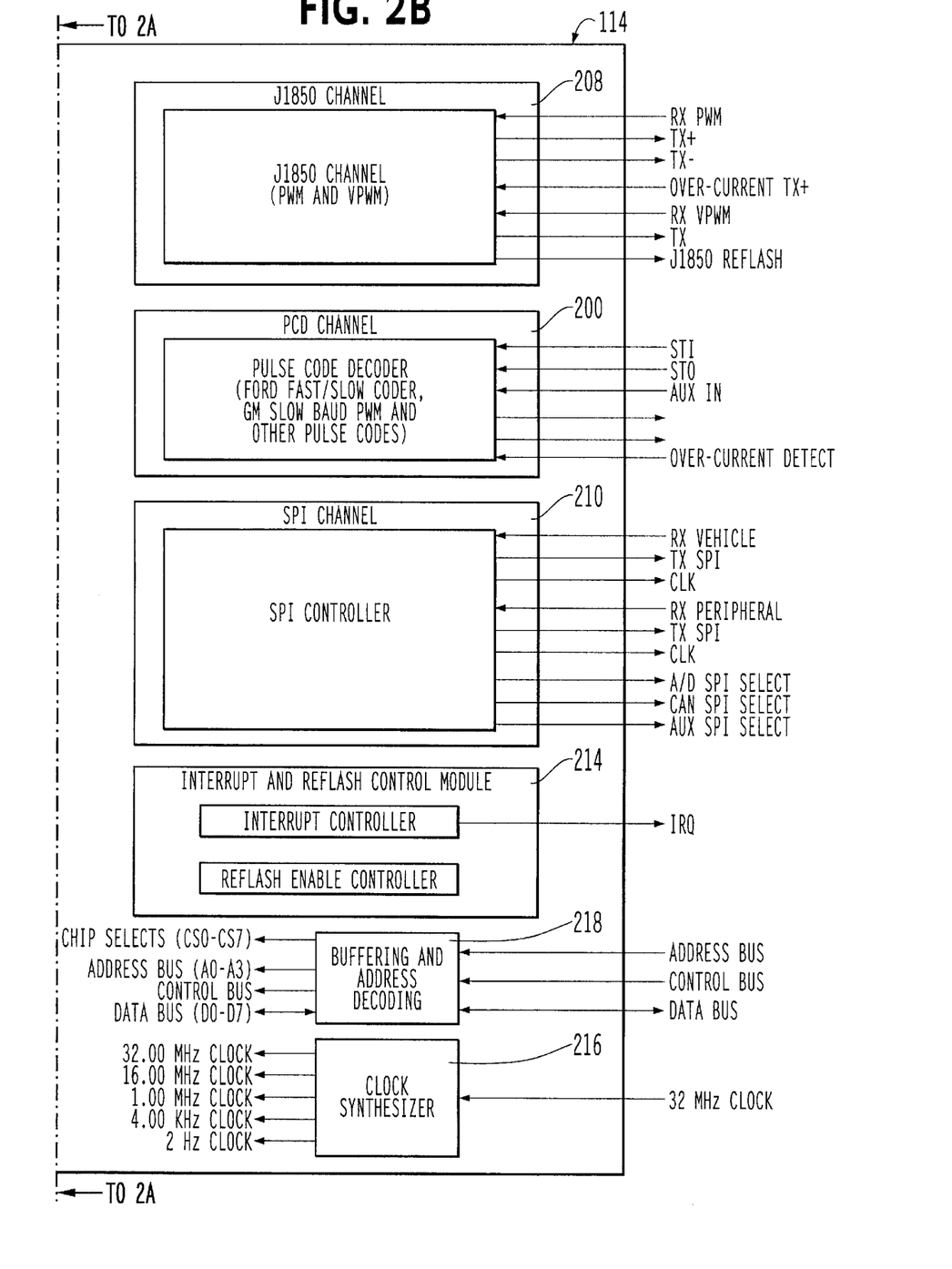

A diagnostic tool, embodying the present invention, provides a multi-vehicle communication interface. The multi-vehicle communication interface provides interface logic for on-board diagnostics (OBD) I, OBD II and enhanced OBD II vehicles. An embodiment of the present invention includes a logic device that has eight modules as is shown in FIG. 2. The disclosed modules are configured such that they can selectively implement multiple communication protocols. For example, a J1850 channel module handles either a PWM or a VPWM communication protocol. Grouping similar communication protocols within a single module allows conversion circuitry that is common to the grouped communication protocols to be shared.

Figure 1:
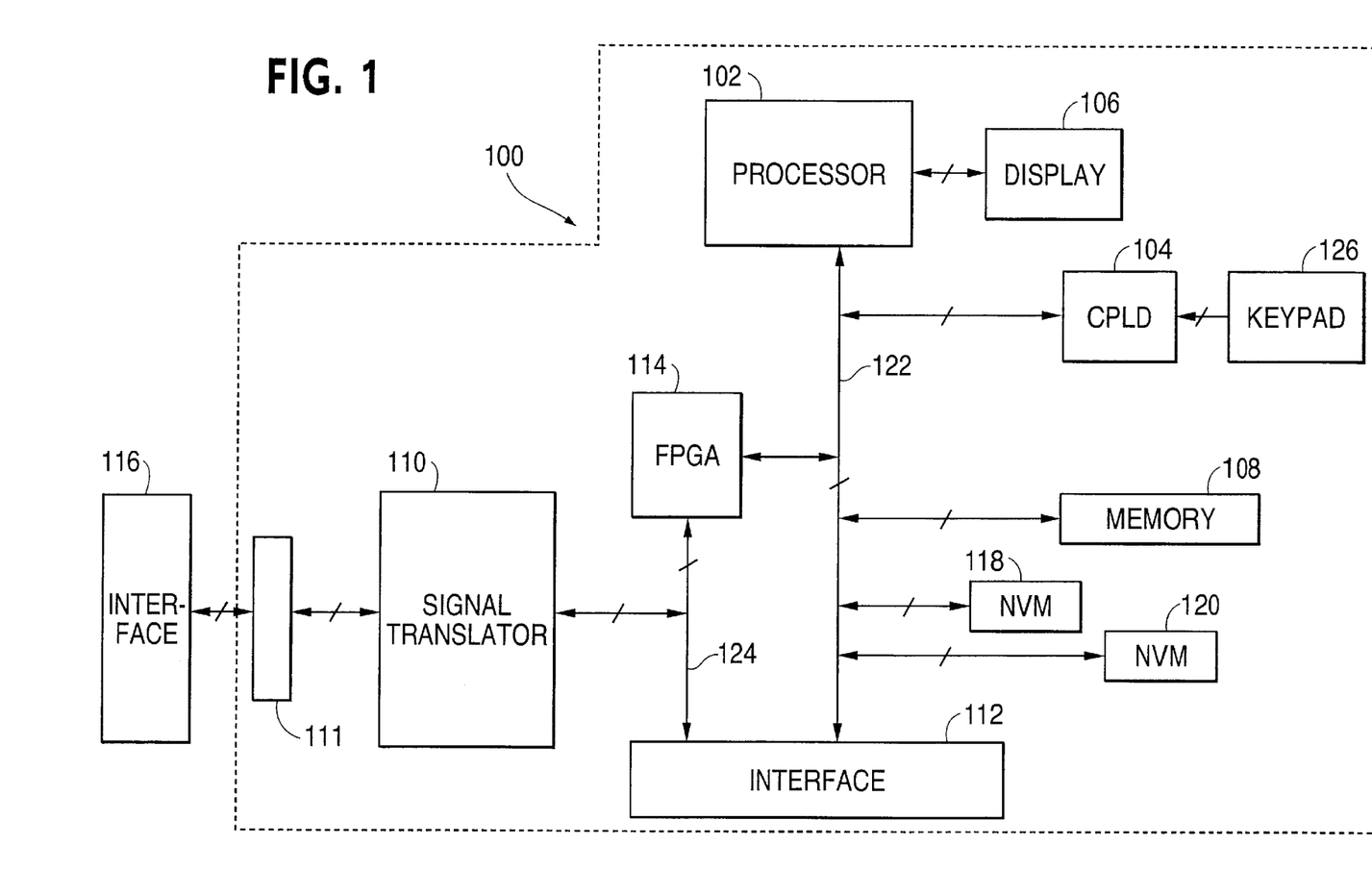
FIG. 1 is a block diagram of a diagnostic tool, according to an embodiment of the present invention.

In FIG. 1, a diagnostic tool 100 according to an embodiment of the present invention includes a processor 102, a field programmable gate array (FPGA) 114, a display 106, a complex programmable logic device (CPLD) 104, a keypad 126, a memory subsystem 108, an internal non-volatile memory 118, an external non-volatile memory 120, a hardware interface port 112 and a selectable signal translator 110 coupled as shown in FIG. 1.

Selectable signal translator 110 is coupled to a motor vehicle communication interface 116 through an external cable (not shown) that is motor vehicle dependent. Translator 110 conditions signals received from a motor vehicle control unit to a conditioned signal compatible with diagnostic tool 100. For example, the J1850 VPWM standard requires a high level signal to be between 4.25 and 20 volts and a low level signal to be between ground and 3.5 volts. In a typical 3.3 volt implementation, diagnostic tool 100 would require a high level signal to be between about 2.64 and 3.3 volts and a low level signal to be between ground and about 0.66 volts. Thus, in this case, translator 110 translates a received signal to a voltage level appropriate for diagnostic tool 100. In a similar manner, translator 110 translates a signal that is being transmitted from diagnostic tool 100 to a motor vehicle control unit, to an appropriate voltage level. If desired, translator 100 can be designed to condition a signal in ways other than voltage translation (e.g., filtering a signal). In addition to translating J1850 signals, translator 110 can condition signals for ISO 9141, communication collision detection (CCD) (e.g., Chrysler collision detection), data communication links (DCL), serial communication interface (SCI), S/F codes, a solenoid drive, J1708, RS232, controller area network (CAN), a 5 volt I/O, a diagnostic enable and an A/D converter.

Circuitry for translating a signal from one voltage level to another is well known to those of ordinary skill in the art. In the preferred embodiment, translator 110 includes circuitry to translate all signal voltage levels currently implemented within a motor vehicle. As such, the circuitry to translate a particular communication protocol's voltage levels is selected by FPGA 114 (e.g., by tri-stating unused transceivers) or by providing a keying device that plugs into a connector 111 that is provided by diagnostic tool 100 to connect diagnostic tool 100 to vehicle communication interface 116.

Translator 110 is also coupled to FPGA 114 and hardware interface port 112 via bus 124. FPGA 114 transmits to and receives signals (i.e., messages) from a motor vehicle control unit through translator 110. FPGA 114 provides an appropriate signal to translator 110 so that a received signal (e.g., data) or a transmitted signal (e.g., a command) is translated, as previously discussed above, according to the communication protocol implemented by the motor vehicle control unit.

FPGA 114 is coupled to processor 102 through various address, data and control lines by the system bus 122. FPGA 114 is also coupled to hardware interface port 112 through bus 124. As is discussed in more detail below, FPGA 114 provides a multiple communication protocol interface between processor 102 and a motor vehicle control unit. In the preferred embodiment, FPGA 114 is a 10K50E manufactured by Altera Corporation. The multiple communication protocol interface converts messages (e.g., data) from a communication protocol implemented by a motor vehicle control unit into a processor readable format. In this manner, processor 102 can read error codes from a motor vehicle control unit and provide test signals to a motor vehicle control unit such that various actuators and/or sensors within a motor vehicle can be tested. Hardware interface port 112 provides a port from which various legacy diagnostic programs can be downloaded.

Processor 102 is also coupled to a display 106 and to CPLD 104 through system bus 122. Processor 102 is programmed to provide output to a user through display 106 and receive input from the user through a keypad 126. Processor 102 runs selected communication routines to communicate with selected motor vehicle control units. In the preferred embodiment, processor 102 is a MPC823 manufactured by the Motorola Corporation. CPLD 104 is also coupled to keypad 126. CPLD 104 provides logic for decoding various inputs from the user of diagnostic tool 100 (through keypad 126) and also provides glue-logic for various other interfacing tasks.

Memory subsystem 108, internal non-volatile memory 118 and external non-volatile memory 120 are coupled to system bus 122. Memory subsystem 108 includes an application dependent amount of dynamic random access memory (DRAM) and read only memory (ROM). Internal non-volatile memory 118 and external non-volatile memory 120 can be an electrically erasable programmable read-only memory (EEPROM) or flash ROM. Internal non-volatile memory 118 can provide storage for boot code, self-diagnostics, various drivers and space for FPGA images, if desired. External non-volatile memory 120 can provide for storage of updated programs or data (e.g., diagnostic trouble codes (DTCs)). If less than all of the modules are implemented in FPGA 114, memory 118 and/or memory 120 can contain downloadable images (so that FPGA can be reconfigured for a different group of communication protocols).

FIG. 2 further depicts FPGA 114, which includes eight modules, according to an embodiment of the present invention. A first module, a pulse code decoder (PCD) channel module 200, includes a PCD for GM slow baud pulse width modulation (PWM), Ford fast and slow pulse codes and for Import pulse code protocols. A second module 202, is serial communication interface (SCI) channel #1 for generic GM, Chrysler and Import SCI vehicle communications. A third module 204, is SCI channel #2 for Chrysler collision detection, Ford data communications link (DCL), heavy duty J1708 and RS232 vehicle communications.

A fourth module 206, is SCI channel #3 for ISO 9141, Ford 9141, Keyword 2000, and Harley-Davidson SCI vehicle communication. A fifth module 208, provides a J1850 channel for PWM and variable pulse width modulation (VPWM) vehicle communication. A sixth module 210, is a serial peripheral interface (SPI) channel module to communicate with an analog-to-digital (A/D) converter, a controller area network (CAN) interface and Import SPI vehicles.

A seventh module 212 provides multiple timers for the timing of various vehicle communications. An eighth module 214, is an interrupt and reflash control module, which provides for enabling and disabling the interface's global interrupt and provides the capability of performing reflash operations, on a memory within a motor vehicle. In addition, FPGA 114 includes a clock synthesizer 216, as well as, various buffers and logic for address decoding 218.

Implementing multiple modules within one logic device such as FPGA 114, provides a comprehensive interface that can accommodate multiple communication protocols found in many motor vehicles. As disclosed herein, each module has a corresponding block of sixteen 8-bit address locations. These address locations (registers) allow a user to program a module for a desired communication protocol.

Figure 3:
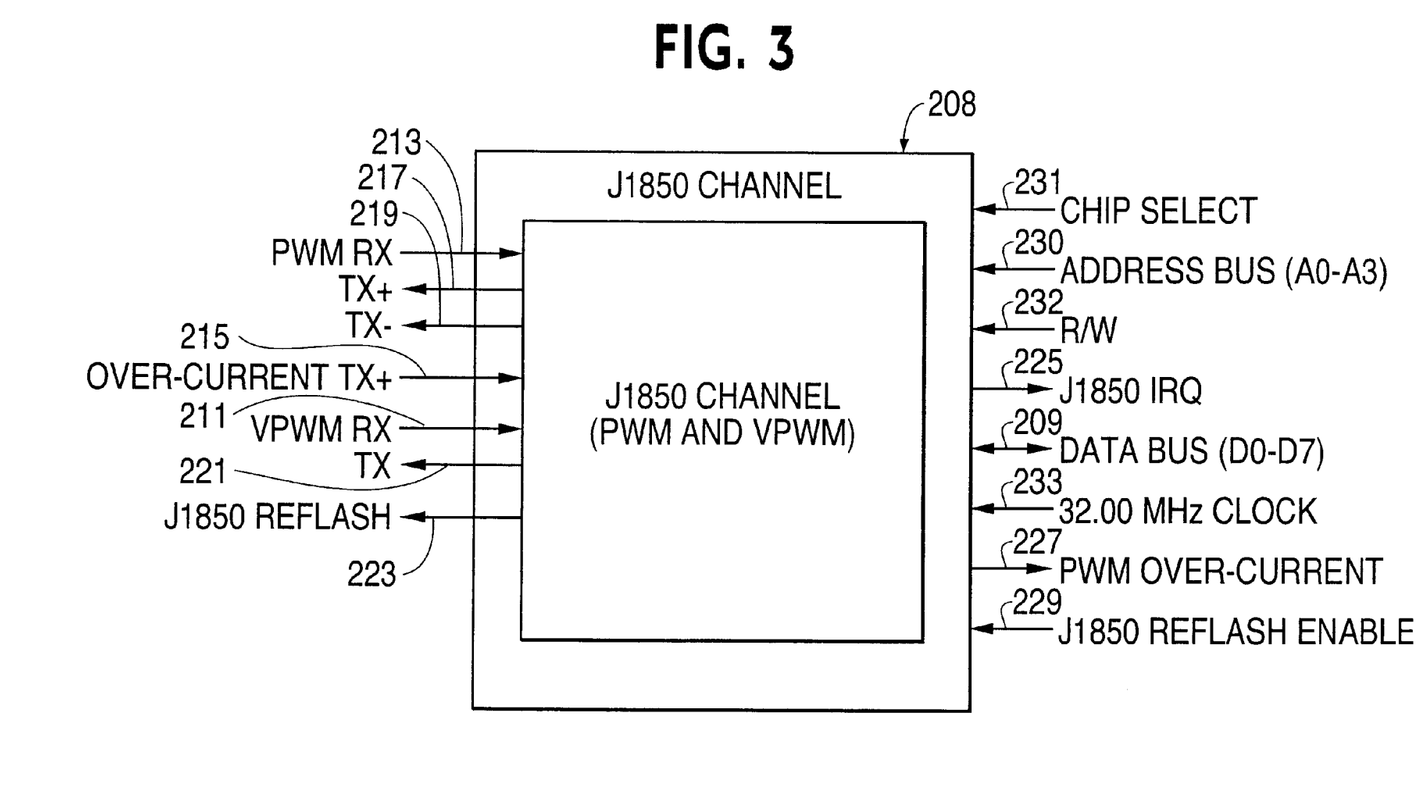
FIG. 3 is a block diagram of a J1850 communication protocol module, according to an embodiment of the present invention.

While the preferred embodiment includes eight modules, the discussion herein is limited to the fifth module 208. All other communication protocol modules are implemented in a similar fashion as will be readily apparent to those of ordinary skill in the art. As configured, module 208 handles J1850 communication for the VPWM (GM and Chrysler) and PWM (Ford) protocols. FIG. 3 is a block diagram of the J1850 channel module. Information is provided to J1850 channel module 208 across a data bus 209 (D0–D7), a VPWM receive line 211 (VPWM RX), a PWM receive line 213 (PWM RX) and an over-current transmit (TX+) line 215. The J1850 channel module 208 transmits data to a motor vehicle control unit across the differential transmission lines 217 and 219 (PWM TX+ and PWM TX–, respectively) when programmed for PWM mode. When programmed for a VPWM mode, J1850 channel module 208 transfers information over a VPWM transmission line 221 (VPWM TX).

J1850 channel module 208 also provides a J1850 reflash signal on line 223, a J1850 interrupt request (IRQ) signal on line 225 and a PWM over-current signal on line 227. J1850 channel module 208 also receives a J1850 reflash enable signal on line 229. When addressed over an address bus 230 (A0–A3) and enabled by the chip select line 231, J1850 channel module 208 either provides or receives information across the data lines 209 (D0–D7). This is determined by the state of a read/write (R/W) line 232. A clock input line 233 supplies 32 MHz clock pulses to module 208.

Figure 4:
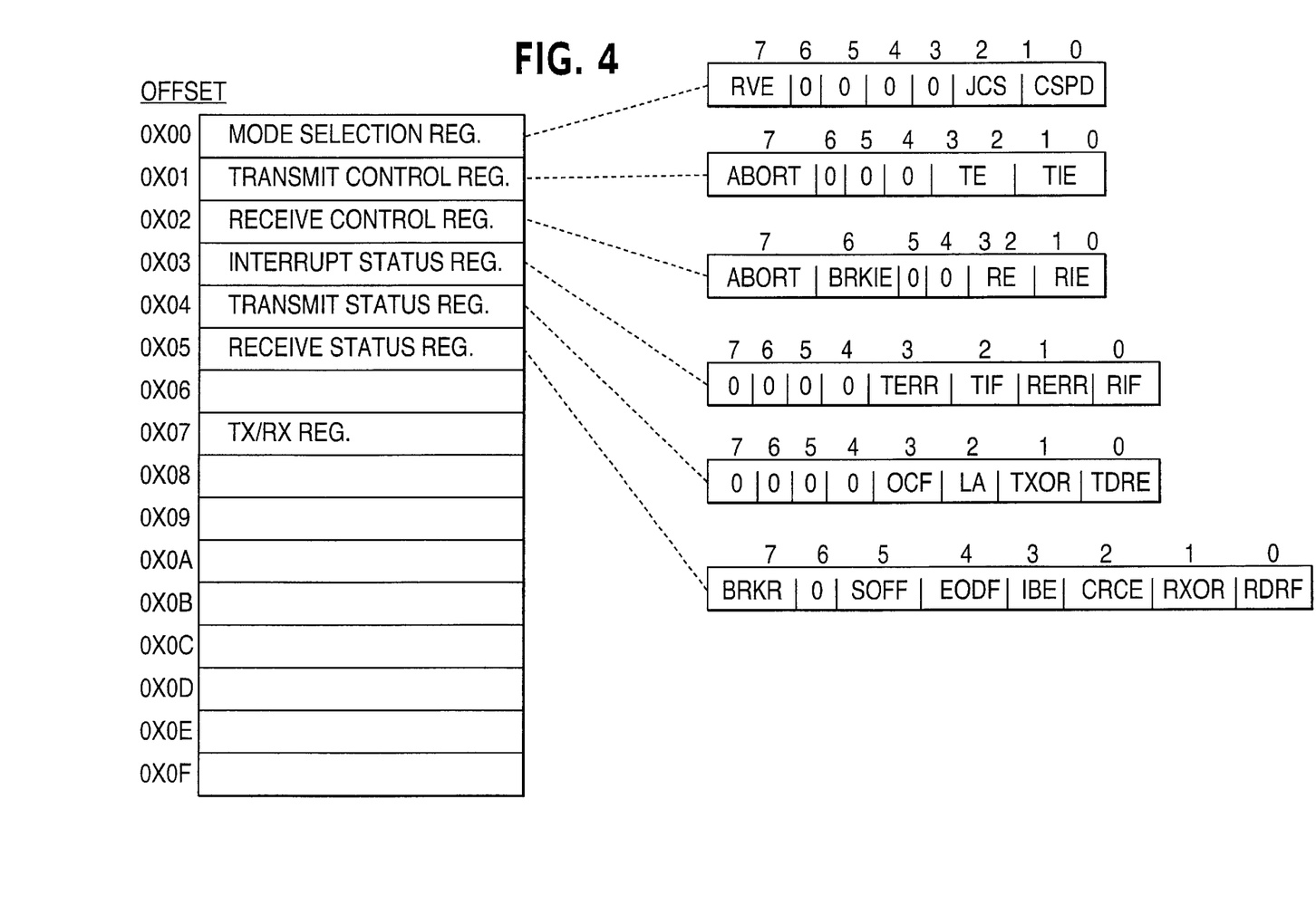
FIG. 4 is a diagram of the control and status registers for the J1850 communication protocol module of FIG. 3, according to an embodiment of the present invention.

FIG. 4 is the address map of the J1850 channel module 208. A mode selection register is located at address offset 0X00. A transmit control register is located at address offset 0X01. A receive control register is located at address offset 0X02. An interrupt status register is located at address offset 0X03. A transmit status register is located at address offset 0X04. A receive status register is located at address offset 0X05. A transmit/receive (TX/RX) register is located at address offset 0X07. Each of these registers, which in the disclosed embodiment are 8-bit registers, are further described below.

The mode selection register controls the operational mode of the J1850 channel module. When bit 7 (RVE) of the mode selection register is high, the reflash voltage is enabled. When bit 7 of the mode selection register is low, the reflash voltage is disabled. If bit 2 (JCS) of the mode selection register is high, the VPWM protocol is selected. If bit 2 of the mode selection register is low, the PWM protocol is selected. Bit 0 and bit 1 (CSPD) of the mode selection register determine the communication speed. If both bits 0 and 1 of the mode selection register are high, the speed is set to a multiple of four. If bit 1 of the mode selection register is high, the speed is set to a multiple of two. If bit 0 of the mode selection register is high, the speed is set to a multiple of one. For PWM, this corresponds to a baud rate of 41.6k. For VPWM, this corresponds to a baud rate of 10.4k. When both bits 1 and 0 of the mode selection register are low, communication is disabled. Writing to the mode selection register performs an internal reset operation. That is, all of the registers are reset to their power-on reset state.

The transmit control register controls transmit operations. When bit 7 (ABORT) of the transmit control register is high, all transmit operations are aborted. Setting bit 6 (3RKIE) of the transmit control register high causes a brake character to be sent. Any transmit or receive operation that is currently in progress will complete before the brake character is sent. Bit 6 of the transmit control register is reset low only after the brake character has been transmitted or an abort control bit has been set high.

Bits 2 and 3 (TE) of the transmit control register determine how a transmit operation is performed. If both bits 2 and 3 are low, no transmit operation is in progress. When bit 2 is high, a normal transmit operation is to be performed. When bit 3 is high, an in-frame response (IFR) is sent without a CRC (cyclic redundancy check) bit. The IFR provides a platform for remote receiving nodes to actively acknowledge a transmission. The remote receiving node appends a reply to the end of the transmitting nodes original message frame. IFRs allow for increased efficiency in transmitting messages since the receiving node may respond within the same message frame that the request originated.

When both bits 2 and 3 are high, an in-frame response is sent with a CRC bit. Bits 2 and 3 are only reset after the transmit operation is complete, the abort control bit is set high or if arbitration is lost during data transmission. Bits 0 and 1 (TIE) of the transmit control register dictate whether an interrupt is generated. If bits 0 and 1 are low, no interrupt is generated. If bit 0 is high, an interrupt is generated when the transmit FIFO buffer is not full. If bit 1 is high, an interrupt is generated when the transmit FIFO buffer contains fewer than eight bytes. If bits 0 and 1 are high, an interrupt is generated when an EOD (end-of-data) character is transmitted.

The receive control register dictates how receive operations are handled. Setting bit 7 (ABORT) of the receive control register high aborts all receive operations. Bit 6

(BRKIE) of the receive control register dictates how an interrupt is handled. If bit 6 is high, an interrupt is generated when a brake character is received. If bit 6 is low, no interrupt is generated when a brake character is received. Bits 2 and 3 (RE) of the receive control register determine how or whether a receive operation is enabled. If bits 2 and 3 are low, no receive operation is in progress. If bit 2 is high, a normal receive operation is to be performed. If bit 3 is high, an in-frame response is received without a CRC bit. If both bits 2 and 3 are high, an in-frame response is received with a CRC bit. Bits 0 and 1 (RIE) dictate how a receive interrupt is handled. If bits 0 and 1 are high, an interrupt is generated when a EOD character is received. If bit 1 is high and bit 0 is low, an interrupt is generated when the receive FIFO buffer contains four or more bytes. When bit 0 is high, an interrupt is generated when the receive FIFO buffer is not empty. If bits 0 and 1 are low, no interrupt is generated.

In the disclosed embodiment, there are three 8-bit read-only registers which report the status of the J1850 channel. The first register reports the interrupt status of the J1850 channel. The second and third registers report the status of any transmit and receive operations, respectively.

The interrupt status register provides various status information. If bit 3 (TERR) of the interrupt status register is high, a transmit error has occurred. If bit 2 (TIF) of the interrupt status register is high, a transmit interrupt has been generated. If bit 1 (RERR) of the interrupt status register is high, a receive error has occurred. If bit 0 (RIF) of the interrupt status register is high, a receive interrupt has been generated.

The transmit status register also provides various status information. If bit 3 (OCF) of the transmit status register is high, the external vehicle interface circuitry has detected an over-current condition. In response to the over-current condition, the JCS field (bit 2) of the mode selection register is set low (to disable the appropriate transmitting output). If bit 2 (LA) of the transmit status register is high, arbitration was lost during transmission. If bit 1 (TXOR) of the transmit status register is high, a byte was written to the transmit buffer while it was full. If bit 0 (TDRE) of the transmit status register is high, the transmit buffer is empty.

The receive status register also provides various information. If bit 7 (BRKR) of the receive status register is high, a break character was detected. If bit 5 (SOFF) of the receive status register is high, the byte currently stored in the receive buffer was the first byte after the start-of-frame (SOF) bit character. If bit 4 (EODF) of the receive status register is high, the previously stored byte was the last byte of the message. If bit 3 (IBE) of the receive status register is high, an invalid bit was detected during reception. If bit 2 (CRCE) of the receive status register is high, an invalid CRC was detected during operation. If bit 1 (RXOR) of the receive status register is high, an overrun occurred in the receive buffer. If bit 0 (RDRF) of the receive status register is high, the receive buffer is not empty.

The transmit/receive (TX/RX) register is used for transmitting and receiving 8-bit characters. The transmit/receive data register is formed from a 8-bit by 32 byte FIFO. A 2-bit wide by 32-bit deep FIFO is used to hold SOF and EOD status information. Thus, register allocation for J1850 channel module 208, according to an embodiment of the present invention, has been described. One skilled in the art will readily appreciate that various other information could be provided and/or other control bits could be implemented within the logic module.

The J1850 channel module 208 has been configured such that it can selectively implement multiple communication protocols. Specifically, the J1850 channel module can handle either PWM or VPWM communication protocols. Similar communication protocols are typically grouped within the other modules of FPGA 114 such that conversion circuitry common to the grouped communication protocols can be shared. Utilizing multiple modules such as modules 200, 202, 204, 206, 208, 210, 212, 214, 216 and 218 all contained in the FPGA 114, allows the user to advantageously diagnose vehicles that implement multiple communication protocols within the same vehicle.

The above description is considered that of the preferred embodiment only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A diagnostic tool for communicating with a plurality of motor vehicle control units within a single motor vehicle, the plurality of motor vehicle control units implementing at least two different communication protocols, the diagnostic tool comprising:

a processor for executing a plurality of diagnostic routines and thereby providing messages to at least one of the plurality of motor vehicle control units, wherein each of the plurality of diagnostic routines corresponds to a selected motor vehicle control unit; and a field programmable gate array providing a selectable multiple protocol interface to accommodate the at least two different communication protocols, said gate array coupled between the plurality of motor vehicle control units and the processor, the selectable multiple protocol interface converting the messages from the processor into a format readable by the selected motor vehicle control unit and converting received control unit information into a format readable by the processor.

2. The diagnostic tool of claim 1, further comprising:

a selectable signal translator coupled between the plurality of motor vehicle control units and the field programmable gate array, the selectable signal translator conditioning the messages from the processor or the control unit information from the selected motor vehicle control unit to a conditioned signal compatible with the selected motor vehicle control unit or the processor, respectively.

3. The diagnostic tool of claim 1, further comprising:

a non-volatile memory coupled to the processor, the non-volatile memory storing the diagnostic routines for the selected motor vehicle control unit which responds to receive the messages from the processor and to transmit the control unit information to the processor in response to the messages.

4. The diagnostic tool of claim 3, wherein the non-volatile memory is a flash ROM.

5. The diagnostic tool of claim 3, wherein the non-volatile memory is an EEPROM.

6. The diagnostic tool of claim 3, wherein the non-volatile memory is provided external to the diagnostic tool as a plug-in module.

7. The diagnostic tool of claim 1, further including:

at least one input coupled to the processor for receiving input data from a user, the user initiating one of the diagnostic routines by entering a selection; and a display coupled to the processor for displaying the results provided by the initiated diagnostic routine.

8. The diagnostic tool of claim 1, wherein the selectable multiple protocol interface is a J1850 channel module that includes conversion circuitry for J1850 variable pulse width modulation (VPWM) and J1850 pulse width modulation (PWM) communication protocols.

9. The diagnostic tool of claim 1, wherein the selectable multiple protocol interface is a pulse code decoder (PCD) channel module.

10. The diagnostic tool of claim 1, wherein the selectable multiple protocol interface is a serial communication interface (SCI) channel module.

11. The diagnostic tool of claim 1, wherein the selectable multiple protocol interface includes conversion circuitry for a communication collision detection (CCD) communication protocol.

12. The diagnostic tool of claim 1, wherein the selectable multiple protocol interface is a serial communication interface (SCI) channel module that includes conversion circuitry for an ISO 9141 communication protocol.

13. The diagnostic tool of claim 1, wherein the selectable multiple protocol interface includes a serial communication interface (SCI) channel module that includes conversion circuitry for an analog-to-digital converter, a controller area network (CAN) and a serial peripheral interface (SPI) communication protocol.

14. A method of providing diagnostic capability for a plurality of motor vehicle control units within a single motor vehicle, the plurality of motor vehicle control units utilizing at least two different communication protocols, the method comprising the steps of:

receiving an indication of a diagnostic routine to be executed, the diagnostic routine being applicable to a selected motor vehicle control unit;

selecting a channel module for communicating with the selected motor vehicle control unit, the channel module including a plurality of communication protocols;

enabling one of the plurality of communication protocols of the selected channel module;

providing messages from the processor to the selected motor vehicle control unit by providing a selectable multiple protocol interface to accommodate the at least two different communication protocols, said messages being provided in a format that is readable by the selected motor vehicle control unit; and providing control unit information from the selected motor vehicle control unit in a format readable by the processor.

15. The method of claim 14, wherein the channel module is a J1850 channel module that includes conversion circuitry for J1850 variable pulse width modulation (VPWM) and J1850 pulse width modulation (PWM) communication protocols.

16. The method of claim 14, wherein the channel module is a pulse code decoder (PCD) channel module.

17. The method of claim 14, wherein the channel module is a serial communication interface (SCI) channel module.

18. The method of claim 14, wherein the channel module includes conversion circuitry for a communication collision detection (CCD) communication protocol.

19. The method of claim 14, wherein the channel module is a serial communication interface (SCI) channel module that includes conversion circuitry for an ISO 9141 communication protocol.

20. The method of claim 14, wherein the channel module includes a serial communication interface (SCI) channel module that includes conversion circuitry for an analog-to-digital converter, a controller area network (CAN) and a serial peripheral interface (SPI) communication protocol.

21. The method of claim 14, further comprising:

providing the selectable multiple protocol interface via a field programmable gate array.

* * * * *